United States Patent
Kong et al.

(10) Patent No.: US 8,570,659 B2
(45) Date of Patent: Oct. 29, 2013

(54) VARIABLE FOCUS LIQUID LENS

(75) Inventors: Seong Ho Kong, Yeongcheon-si (KR); Hak-Rin Kim, Daegu (KR); June Kyoo Lee, Daegu (KR); Kyung-Woo Park, Daegu (KR)

(73) Assignee: Kyungpook National University Industry-Academic Cooperation Foundation (KR)

( * ) Notice: Subject to any disclaimer, the term of this patent is extended or adjusted under 35 U.S.C. 154(b) by 13 days.

(21) Appl. No.: 13/456,940

(22) Filed: Apr. 26, 2012

(65) Prior Publication Data
US 2012/0275030 A1    Nov. 1, 2012

(30) Foreign Application Priority Data
Apr. 28, 2011    (KR) .................. 10-2011-0040283

(51) Int. Cl.
*G02B 1/06*    (2006.01)

(52) U.S. Cl.
USPC .......................................................... 359/665

(58) Field of Classification Search
USPC .......................................................... 359/665
See application file for complete search history.

*Primary Examiner* — Jack Dinh
(74) *Attorney, Agent, or Firm* — Cantor Colburn LLP

(57) ABSTRACT

A variable focus liquid lens includes: a lens barrel which is configured to include a first cavity to contain first and second liquids which are not mixed with each other in upper and lower portions of the first cavity, respectively; a fluid pressure driving unit which is configured to include a second cavity, a fluid pressure generating groove, and an actuator generating a fluid pressure on the second liquid so as to adjust the fluid pressure of the second liquid by using the actuator; a first transparent elastic membrane sealing an upper portion of the first cavity of the lens barrel; and a conductive transparent substrate sealing a lower portion of the second cavity of the fluid pressure driving unit. The focal length is adjusted by changing the curvatures of the surfaces of the first and second liquids and the curvature of the first transparent elastic membrane by a voltage.

10 Claims, 4 Drawing Sheets

VARIABLE FOCUS LIQUID LENS

CROSS-REFERENCE TO RELATED PATENT APPLICATION

This application claims the benefit of Korean Patent Application No. 10-2011-0040283, filed on Apr. 28, 2011, in the Korean Intellectual Property Office, the disclosure of which is incorporated herein in its entirety by reference.

BACKGROUND OF THE INVENTION

1. Field of the Invention

The present invention relates to a liquid lens, and more particularly, to a variable focus liquid lens capable of adjusting a focal length by an electrical signal without mechanical driving by simultaneously allowing focus adjustment using an electrowetting phenomenon and focus adjustment using a fluid pressure of an electromagnetic actuator integrated with the liquid lens.

2. Description of the Prior Art

In general, a lens module of a high-performance digital camera is configured to include an optical lens made of glass and a lens driving unit for driving the optical lens. In the lens module, in order adjust the focus and magnification of the optical lens, positions between several sheets of the optical lens are controlled by using the lens driving unit.

In this manner, in the high-performance digital camera in the related art, since the lens driving unit for adjusting the focus and magnification needs to be installed, the size of the digital camera inevitably increases, and it is difficult to miniaturize the high-performance digital camera.

Recently, a liquid lens capable of adjusting the focus and magnification of the lens without a lens driving unit has been developed. In the liquid lens, a curvature of a liquid droplet is adjusted due to electrowetting phenomenon, so that the focal length can be adjusted. The principle of the electrowetting is described with reference to FIG. 1. As illustrated in FIG. 1, if a conductive liquid droplet 40 having a diameter of 2 mm or less is dropped on an upper surface of an insulating film 14 which is electrically isolated, a spherical droplet is formed as indicated by the solid line in FIG. 1. If a voltage is applied between a first electrode 13 below the insulating film 14 and a second electrode for the electrolytic droplet, the electrowetting phenomenon occurs as indicated by the dotted line in FIG. 1. In other words, a contact angle $\theta 1$ between the conductive liquid droplet 40 and the insulating film 13 before the voltage is applied (V=0) and a contact angle $\theta 2$ when the voltage is applied satisfy the relationship of $\theta 1 > \theta 2$. In this manner, the electrowetting denotes a phenomenon where the contact angle is changed due to the electric field formed by the voltage applied to the conductive liquid droplet 40 between the first and second electrodes 13 and 14. The contact angle is a value uniquely determined by characteristics of a liquid droplet, another liquid or air surrounding the liquid droplet, and a material of the upper surface of the insulating film 13. Herein, the diameter of the conductive liquid droplet 40 is limited to 2 mm or less in order that the liquid is dominated by surface tension rather than the gravitational force.

However, in the liquid lens of which the focal length is adjusted by the electrowetting phenomenon has a limitation in the adjustable range of the focal length. Therefore, there is a problem in that it is difficult to quantitatively adjust the focal length. In order to compensate for the limitation, a liquid lens which quantitatively adjusts the focus with a high speed by using a fluid pressure generated by a separate fluid pressure driving unit installed outside the liquid lens has been developed. However, in the liquid lens, a separate fluid pressure generating unit is needed, so that it is difficult to put the liquid lens to practical use. In addition, there is a problem in that the size of the liquid lens increases due to the fluid pressure generating unit.

SUMMARY OF THE INVENTION

The present invention is to provide a variable focus liquid lens capable of simultaneously allowing focus adjustment using electrowetting and focus adjustment using a fluid pressure generated by driving an electromagnetic actuator integrated into the liquid lens, so that it is possible to quantitatively change the focus with a high speed and to obtain a wide adjustable range of the focal length.

According to an aspect of the invention, there is provided a variable focus liquid lens of which focus can be adjusted by an electrical signal, including: a lens barrel having an electric conductivity, which is configured to include a first cavity to contain first and second liquids which are not mixed with each other in upper and lower portions of the first cavity, respectively; a fluid pressure driving unit which is configured to include a second cavity connected to the first cavity, a fluid pressure generating groove connected to the second cavity, and an actuator generating a fluid pressure on the second liquid contained in the second cavity and the fluid pressure generating groove so as to adjust the fluid pressure of the second liquid contained in the fluid pressure generating groove by using the actuator; a first transparent elastic membrane which is disposed on an upper portion of the lens barrel to seal an upper portion of the first cavity of the lens barrel and of which the curvature is changed according to the fluid pressure of the first and second liquids contained in the first cavity; and a conductive transparent substrate having an electric conductivity, which is disposed on a lower portion of the fluid pressure driving unit to seal a lower portion of the second cavity of the fluid pressure driving unit and which is made of a transparent material passing through incident light, wherein a focal length is adjusted by changing the curvatures of the surfaces of the first and second liquids contained in the first cavity of the lens barrel and the curvature of the first transparent elastic membrane by using a voltage applied to the lens barrel and the conductive transparent substrate and the fluid pressure of the first and second liquids.

In the variable focus liquid lens according to the above aspect of the invention, it is preferable that the first liquid be any one of an insulating liquid and a conductive liquid, and the second liquid be the other one of the insulating liquid and the conductive liquid.

In the variable focus liquid lens according to the above aspect of the invention, it is preferable that the first cavity of the lens barrel have a shape of a hemisphere in cross-section.

In the variable focus liquid lens according to the above aspect of the invention, it is preferable that the fluid pressure generating groove be perpendicularly connected to the first cavity.

In the variable focus liquid lens according to the above aspect of the invention, it is preferable that two or more fluid pressure generating grooves be formed in the fluid pressure driving unit, and the fluid pressure generating grooves be disposed symmetrically with respect to the second cavity.

In the variable focus liquid lens according to the above aspect of the invention, it is preferable that the lens barrel be made of silicon (Si) and further include an insulating film on a surface which is in contact with the fluid pressure driving unit, and the insulating film be configured with a silicon oxide film (SiOx).

In the variable focus liquid lens according to the above aspect of the invention, it is preferable that the actuator of the fluid pressure driving unit include: a second transparent elastic membrane which is fixed on an inner wall of the fluid pressure generating groove; a permanent magnet which is disposed in a sealed space between an inner wall of the fluid pressure generating groove and the second transparent elastic membrane; and a solenoid which is disposed in a body of the fluid pressure driving unit adjacent to the inner wall on which the second transparent elastic membrane is fixed, and the actuator change a position of the permanent magnet by using the solenoid and deforms a shape of the second transparent elastic membrane according to the position of the permanent magnet so as to adjust the fluid pressure.

In the variable focus liquid lens according to the above aspect of the invention, it is preferable that the solenoid be adhered to a body of the fluid pressure driving unit by using a curable polymer.

In the variable focus liquid lens according to the above aspect of the invention, it is preferable that the actuator of the fluid pressure driving unit be configured with a piezoelectric device.

In the variable focus liquid lens according to the above aspect of the invention, it is preferable that the variable focus liquid lens further include a controller which controls the driving of the actuator and the voltage applied to the lens barrel and the conductive transparent substrate outside the variable focus liquid lens, and the controller adjust the fluid pressure by controlling the driving of the actuator.

According to a variable focus liquid lens of the invention, after the focus of the lens is adjusted by using the electrowetting phenomenon, a fluid pressure is generated, and curvatures of first and second liquids and a curvature of a first transparent elastic membrane are changed by using the generated fluid pressure, so that it is possible to obtain a wide range of the variable focus. In particular, since the driving unit for generating the fluid pressure is integrated into an inner portion of the variable focus liquid lens, a separate fluid pressure driving unit needs not to be installed, so that it is possible to reduce production costs and to miniaturize the lens.

In addition, according to a variable focus liquid lens of the invention, a voltage applied to the first and second liquids can be adjusted by a controller, and one or more actuators can be independently or simultaneously controlled, so that it is possible to accurately quantitatively change the focus.

In addition, according to a variable focus liquid lens of the invention, an actuator configured with an electromagnetic device is used, so that it is possible to implement the liquid lens having a high response speed.

DETAILED DESCRIPTION OF THE INVENTION

Hereinafter, a structure and operating principle of a variable focus liquid lens according to an exemplary embodiment of the invention will be described with reference to the attached drawings.

Figure 2:
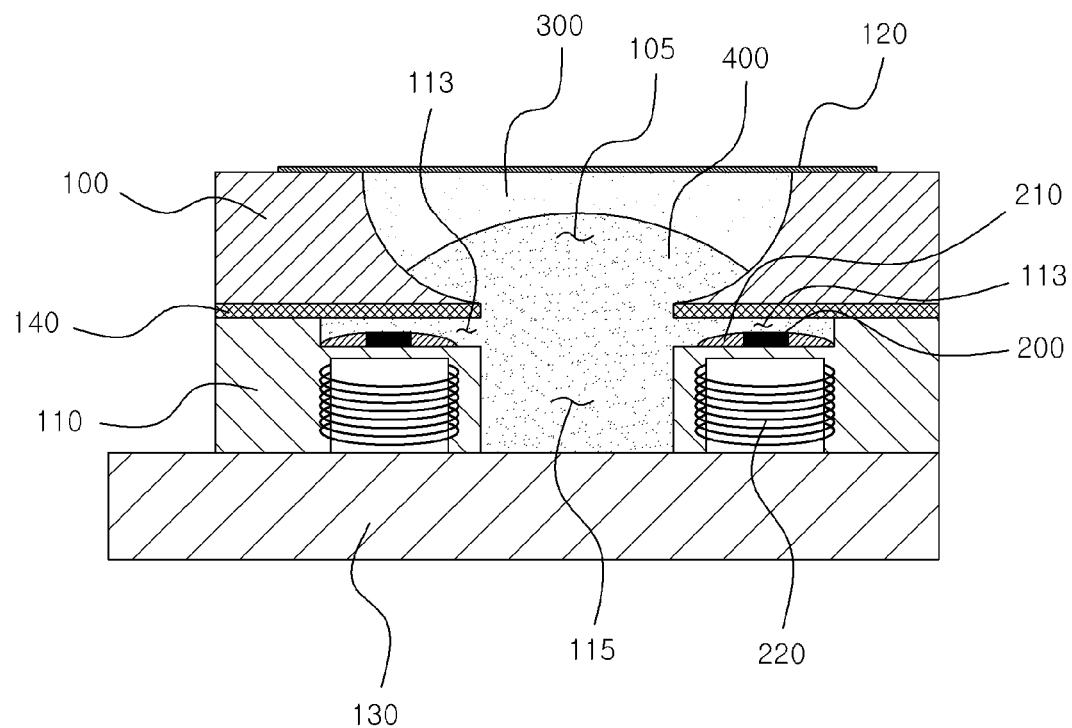
FIG. 2 is a schematic cross-sectional view illustrating a variable focus liquid lens according to an embodiment of the invention.

FIG. 2 is a schematic cross-sectional view illustrating a variable focus liquid lens according to an exemplary embodiment of the invention. Referring to FIG. 2, the variable focus liquid lens according to the embodiment includes a lens barrel 100, a fluid pressure driving unit 110, a first transparent elastic membrane 120, and a conductive transparent substrate 130.

A first cavity is formed in an inner portion of the lens barrel 100. First and second liquids 300 and 400 which are not mixed with each other and have the same density are contained in upper and lower portions of the first cavity, respectively, and the lens barrel 100 has an electric conductivity. The first liquid 300 is any one of an insulating liquid and a conductive liquid, and the second liquid 400 is the other one of the insulating liquid and the conductive liquid. Preferably, the first liquid 300 as an insulating liquid is contained in the upper portion of the first cavity 105, and the second liquid 400 as a conductive liquid is contained in the lower portion of the first cavity 105. In addition, preferably, the lens barrel 100 is made of silicon (Si). In the case where the lens barrel 100 is made of silicon, an insulating film may be further disposed on a surface of the lens barrel 100 being in contact with the fluid pressure driving unit in order to secure the contact with the fluid pressure driving unit 110 described later. The insulating film may be configured with a silicon oxide film (SiOx) or the like.

In addition, as illustrated in FIG. 2, the first cavity 105 of the lens barrel 100 has a shape of a hemisphere in cross-section. In the case where the first cavity 105 is formed in a shape of a hemisphere, the interface between the first and second liquids 300 and 400 is in contact with the hemispherical surface of the first cavity 105. In the case of the liquid lenses having a shape of a cylinder or a truncated cone in the related art, since the interface between the insulating liquid and the conductive liquid is in contact with a flat surface, the meniscus between the insulating liquid and the conductive liquid is larger than that of the variable focus liquid lens having a shape of a hemisphere according to the invention. The meniscus is a curve in the upper surface of a liquid contained in a capillary tube, of which the central portion is pulled up or down in comparison with the wall portion according to the type of the liquid contained. The smaller the meniscus of the two liquids as seen from the first cavity 400, the smaller the electrowetting voltage needed for the deformation of the shape of the liquid. Therefore, a voltage consumed for the focus adjustment of the variable focus liquid lens according to the embodiment of the invention is smaller than that of the liquid lens in the related art.

On the other hand, the fluid pressure driving unit 110 is configured to include a second cavity 115 connected to the first cavity 105 of the lens barrel 100 in an inner portion of a body of the fluid pressure driving unit, a fluid pressure generating groove 113 connected to the second cavity 115, and one or more actuators generating a fluid pressure on a second liquid 400 contained in the second cavity 115 and fluid pressure generating groove 113 so as to adjust the fluid pressure of the second liquid contained in the fluid pressure generating groove by using the actuator. As a result, the fluid pressure is transferred from the second liquid to the first liquid, so that the focal length of the variable focus liquid lens can be adjusted. In addition, preferably, the fluid pressure generating groove 113 is perpendicularly connected to the second cavity 115.

The first transparent elastic membrane 120 is disposed on an upper portion of the lens barrel 100 to seal the upper portion of the first cavity of the lens barrel 100 in which the first and second liquid are contained. The first transparent elastic membrane 120 is made of a material of which the curvature is changed according to the fluid pressure of the first and second liquids. Therefore, if the second liquid is pushed upwards by the fluid pressure generated from the fluid pressure generating groove 113 of the fluid pressure driving unit 110, the first liquid is also pushed upwards in a convex form. Accordingly, the curvature of the first transparent elastic membrane 120 is also changed, so that the focus of the fluid pressure liquid lens can be changed.

The conductive transparent substrate 130 is disposed on a lower portion of the fluid pressure driving unit 110 to seal the lower portion of the second cavity of the fluid pressure driving unit 110 in which the second liquid is contained. The conductive transparent substrate 130 is made of a transparent material passing through incident light. In addition, the conductive transparent substrate 130 has an electric conductivity, so that the conductive transparent substrate 130 together with the lens barrel 100 applies a voltage to the first and second liquids.

Figure 1:
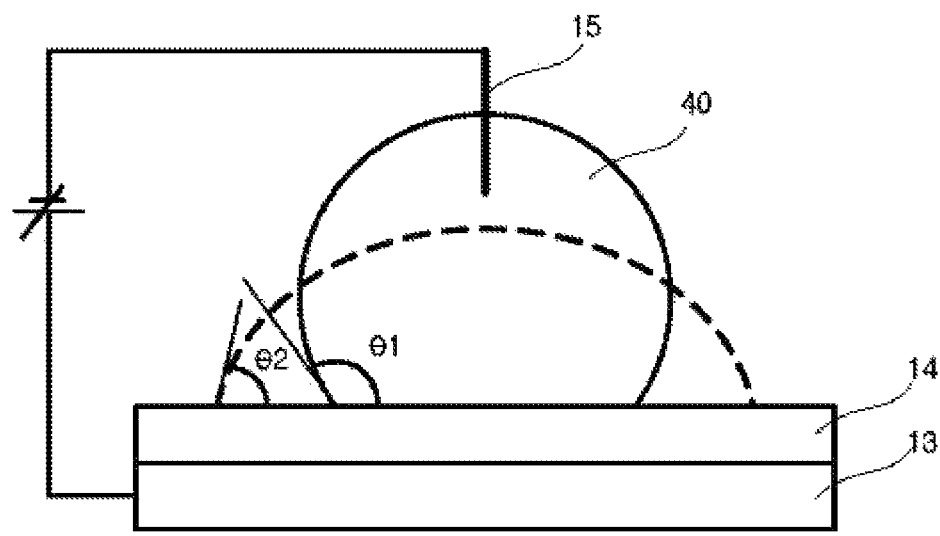
FIG. 1 is a view illustrating a conventional liquid lens of which a focus can be adjusted according to an electrowetting phenomenon.

The fluid pressure generating groove 113 of the fluid pressure driving unit 110 may be disposed at any position where the fluid pressure generating groove 113 can be connected to the second cavity. In the embodiment of the invention, it is exemplified that the fluid pressure generating groove 113 is formed in an upper surface of the fluid pressure driving unit 110. As illustrated in FIG. 1, it is preferable that the fluid pressure generating groove 113 is formed in an upper portion of the fluid pressure driving unit 110. In addition, it is preferable that two or more fluid pressure generating grooves 113 are formed so as to be symmetric with respect to the second cavity 115.

In the variable focus liquid lens having the aforementioned configuration according to the embodiment of the invention, the curvatures of the first and second liquids 300 and 400 contained in the first cavity of the lens barrel 100 and the curvature of the first transparent elastic membrane 120 are changed by using an external voltage applied through the lens barrel 100 and the conductive transparent substrate 130 and the fluid pressure generated due to the driving of the actuator of the fluid pressure driving unit, so that the focal length can be adjusted. In other words, if an external voltage is applied through the lens barrel 100 and the conductive transparent substrate 130, a curvature of the interface between the first and second liquids 300 and 400 is changed due to electrowetting. In addition, the fluid pressure generated due to the driving of the fluid pressure driving unit 110 is transferred through the second liquid 400 to the first liquid 300, so that the curvature of the first transparent elastic membrane 120 is changed. As a result, in the variable focus liquid lens, the focal length can be changed in a wide range.

Hereinafter, the operating principle of the variable focus liquid lens according to the embodiment of the invention will be described in detail. Any device which generates pressure can be adapted to the aforementioned actuator of the variable focus liquid lens. It is preferable that the actuator be configured with one of an electromagnetic device, and a piezoelectric device. In this embodiment, it is exemplified that the actuator is configured with an electromagnetic device.

Figure 3A:
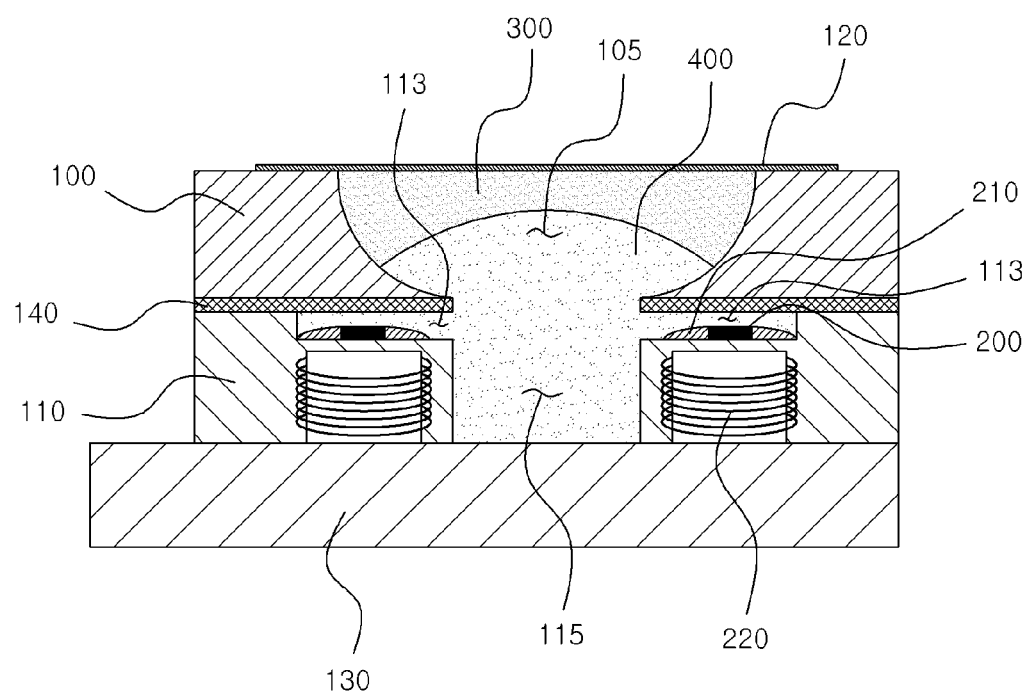
FIGS. 3A to 3C are views illustrating a sequence of operation states of the variable focus liquid lens according to the embodiment of the invention.
Figure 3B:
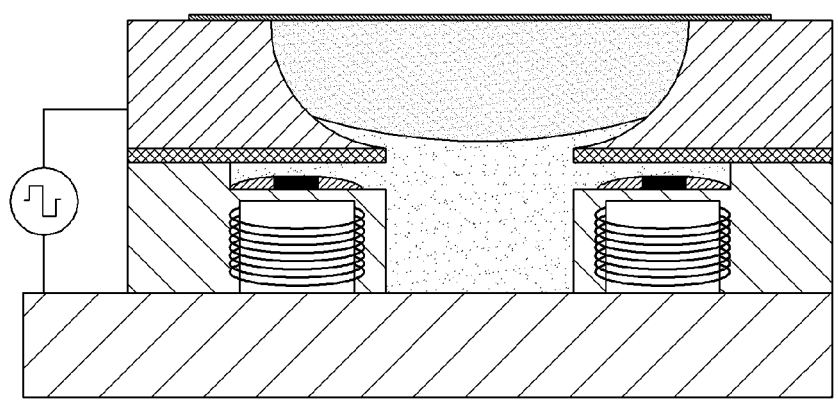
Figure 3C:
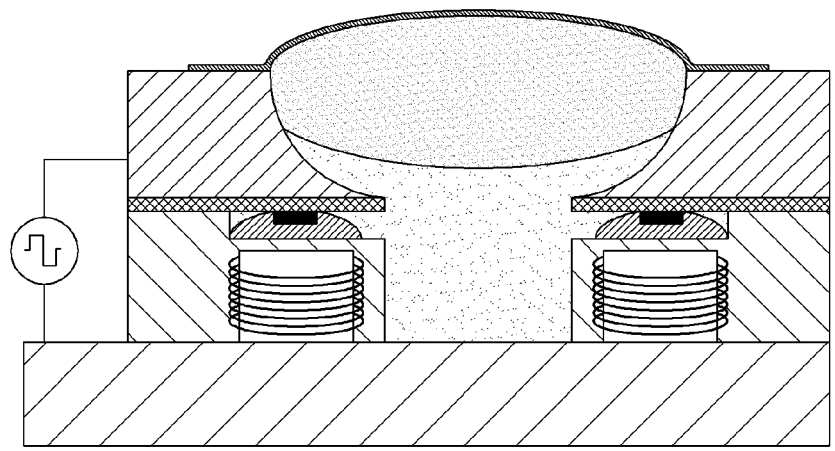
Figure 4A:
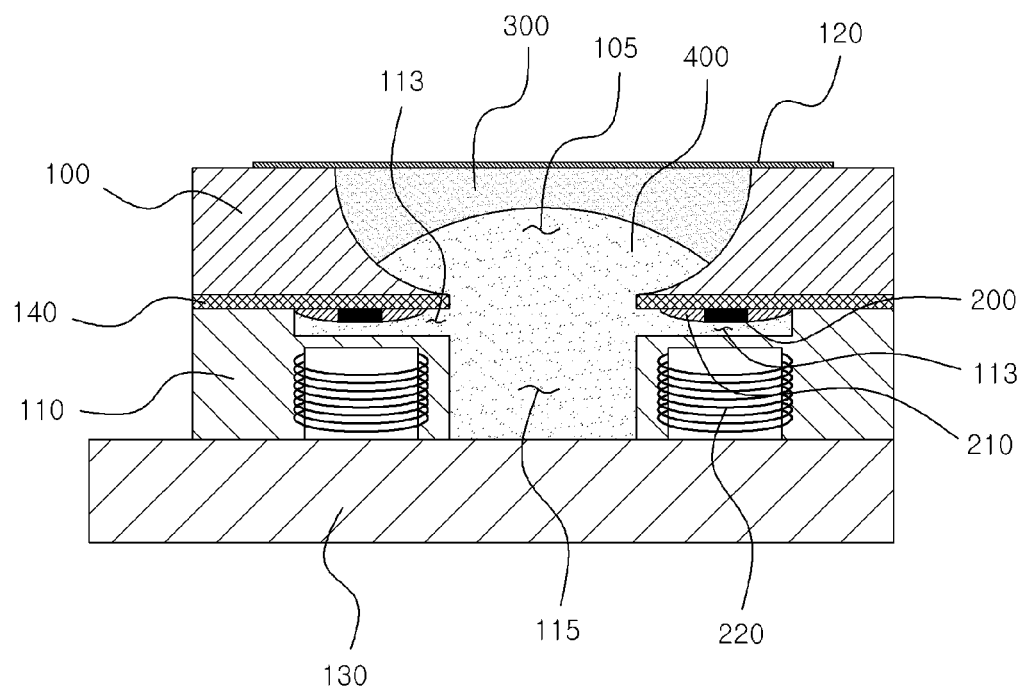
FIGS. 4A to 4C are views illustrating a sequence of operation states of a variable focus liquid lens according to another embodiment of the invention.
Figure 4B:
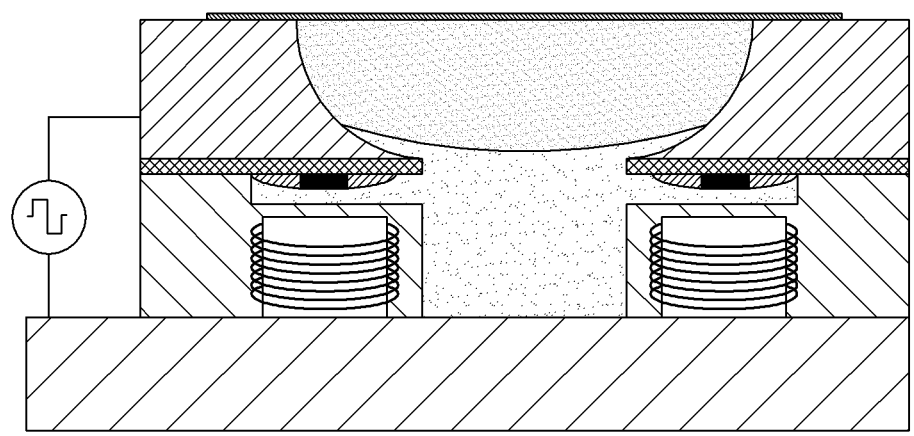
Figure 4C:
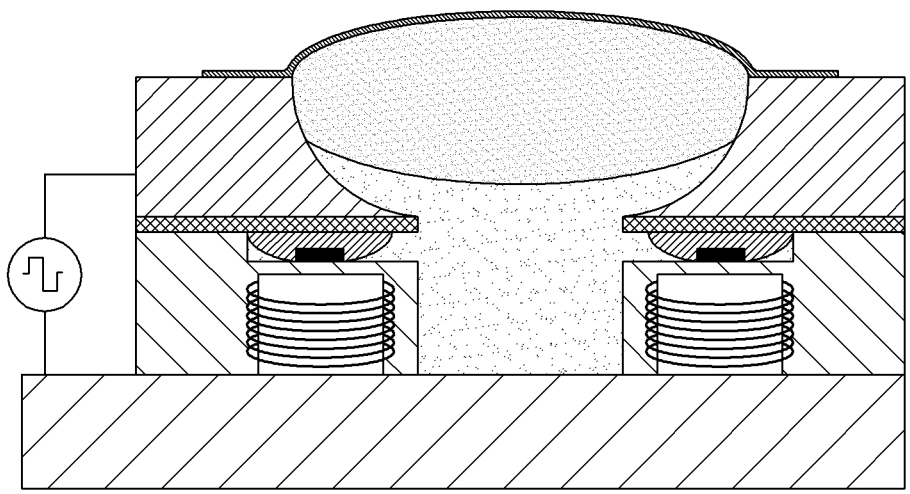

FIGS. 3A to 3C are views illustrating a sequence of operation states of the variable focus liquid lens according to the embodiment of the invention. FIGS. 4A to 4C are views illustrating a sequence of operation states of a variable focus liquid lens according to another embodiment of the invention. Referring to FIG. 3A and FIG. 4A, the actuator of each of the variable focus liquid lenses according to the embodiments of the invention is configured to include a permanent magnet 200, a second transparent elastic membrane 210, and a solenoid 220.

The second transparent elastic membrane 210 is fixed on an inner wall of the fluid pressure generating groove 113, and thus, a sealed space is formed between the inner wall of the fluid pressure generating groove and the second transparent elastic membrane.

The permanent magnet 200 is disposed in the sealed space formed between the inner wall of the fluid pressure generating groove and the second transparent elastic membrane. FIGS. 3A to 3C exemplify an arrangement where the permanent magnet 200 is disposed on the body of the fluid pressure driving unit which is a lower position of the fluid pressure generating groove. FIGS. 4A to 4C exemplify an arrangement where the permanent magnet 200 is disposed on a lower surface of the lens barrel which is an upper position of the fluid pressure generating groove.

On the other hand, the second transparent elastic membrane 210 is configured to surround the permanent magnet 200 so as to fix the permanent magnet on an inner wall of the fluid pressure generating groove 113. The second transparent elastic membrane 210 has an elastic force so as to allow the position of the permanent magnet to be changed according to an external force. In other words, when the external magnetic force is not exerted, the permanent magnet is fixed on the inner wall of the fluid pressure generating groove by the second transparent elastic membrane. In addition, when the external magnetic force is exerted, the position of the permanent magnet is changed, so that the second transparent elastic membrane is also changed. However, since the second transparent elastic membrane has an elastic force, if the external force is removed, the permanent magnet 200 returns to its original position. Therefore, the second transparent elastic membrane 210 serves as a spring, so that the permanent magnet 200 can be allowed to move up and down.

The solenoid 220 is disposed in the body of the fluid pressure driving unit adjacent to the inner wall on which the second transparent elastic membrane is fixed. If a current is applied to the solenoid (coil), a magnetic field is induced to the solenoid, so that the solenoid operates as an electromagnet. It is preferable that the solenoid 220 is adhered to the body of the fluid pressure driving unit by using a curable polymer such as PDMS (polydimethylsiloxane).

In the variable focus liquid lens according to the embodiment of the invention, a controller is further provided outside the variable focus liquid lens, and the driving of the actuator is controlled by the controller. On the other hand, in addition to controlling the driving of the actuator, the controller may control the curvature of the interface between the first and second liquids due to electrowetting by controlling the voltage applied to the lens barrel 100 and the conductive transparent substrate 130.

First, FIG. 3A illustrates a state of the variable focus liquid lens according to the invention where no voltage is applied.

The voltage is applied to the lens barrel 100 and the conductive transparent substrate 130 through the controller. If a voltage is applied to the first and second liquids 300 and 400 contained in the first and second cavities 105 and 115, the curvature of the interface between the two liquids is changed according to the applied voltage due to the electrowetting phenomenon. As illustrated in FIGS. 3A and 4A, in the case where no voltage is applied, the curvature is changed so that the interface between the first and second liquids becomes convex upwards. In addition, as illustrated in FIGS. 3B and 4B, in the case where the voltage is applied, the curvature is changed so that the interface becomes convex downwards. In other words, in the variable focus liquid lens according to the embodiment of the invention, it is possible to adjust the focus of the lens according to the applied voltage.

Next, the controller applies a current to the solenoid. At this time, according to whether the permanent magnet is disposed at a lower position of the fluid pressure generating groove as illustrated in FIG. 3 or the permanent magnet is disposed at an upper position of the fluid pressure generating groove as illustrated in FIG. 4, the direction of applied current becomes different. In other words, in the case where the permanent magnet 200 is disposed at the lower position of the fluid pressure generating groove as illustrated in FIG. 3, the solenoid determines the direction of the current so that a repulsive force is exerted to the permanent magnet. Therefore, the permanent magnet 200 is pushed upwards, so that the fluid pressure can be generated. Referring to FIG. 3C, as described above, the permanent magnet 200, which is pushed upwards, together with the second transparent elastic membrane 210 pushes the liquid contained in the fluid pressure generating groove 113 outwards, so that the fluid pressure can be generated. The fluid pressure is transferred to the second and first liquids 400 and 300 contained in the first cavity 105, so that the liquids are pushed upwards to be expanded convexly upwards, so that the focus is changed by the change in the curvature of the first transparent elastic membrane 120.

Similarly, in the case where the permanent magnet 200 is disposed at the upper position of the fluid pressure generating groove 113 as illustrated in FIG. 4, the solenoid determines the direction of the current so that an attractive force is exerted to the permanent magnet 200. Therefore, the permanent magnet 200 is drawn downwards, so that the fluid pressure can be generated. Referring to FIG. 4C, as described above, the permanent magnet 200, which is drawn downwards, together with the second transparent elastic membrane 210 pushes the liquid contained in the fluid pressure generating groove outwards, so that a fluid pressure is generated.

On the other hand, the controller independently or simultaneously controls one or more actuators provided to the variable focus liquid lens, so that it is possible to accurately quantitatively adjust the fluid pressure.

In this manner, in the variable focus liquid lens according to the embodiment of the invention, after the focus of the lens is adjusted by using the electrowetting phenomenon, a fluid pressure is generated, and curvatures of the first and second liquids and a curvature of the first transparent elastic membrane are changed by using the generated fluid pressure, so that it is possible to obtain a wide range of the variable focus. Particularly, in the variable focus liquid lens according to the embodiment of the invention where a driving unit for generating the fluid pressure is integrated into an inner portion of the variable focus liquid lens, a separate fluid pressure driving unit needs not to be installed, so that it is possible to reduce production costs and to miniaturize the lens. In addition, in the variable focus liquid lens according to the embodiment of the invention, the voltage applied to the first and second liquids is adjusted by the controller, and the actuators can be independently or simultaneously controlled by the controller, so that it is possible to accurately quantitatively change the focal length. In addition, in the variable focus liquid lens according to the embodiment of the invention, since an actuator configured with an electromagnetic device is used, it is possible to implement a liquid lens having a high response speed.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The variable focus liquid lens according to the invention can be adapted to all the fields where a variable focus lens is needed. Particularly, the variable focus liquid lens can be widely used in the field of mobile terminals which have been more miniaturized and various functions are integrated into.

What is claimed is:

1. A variable focus liquid lens of which focus can be adjusted by an electrical signal, comprising:
    a lens barrel having an electric conductivity, which is configured to include a first cavity to contain first and second liquids which are not mixed with each other in upper and lower portions of the first cavity, respectively;
    a fluid pressure driving unit which is configured to include a second cavity connected to the first cavity, a fluid pressure generating groove connected to the second cavity, and an actuator generating a fluid pressure on the second liquid contained in the second cavity and the fluid pressure generating groove so as to adjust the fluid pressure of the second liquid contained in the fluid pressure generating groove by using the actuator;
    a first transparent elastic membrane which is disposed on an upper portion of the lens barrel to seal an upper portion of the first cavity of the lens barrel and of which the curvature is changed according to the fluid pressure of the first and second liquids contained in the first cavity; and
    a conductive transparent substrate having an electric conductivity, which is disposed on a lower portion of the fluid pressure driving unit to seal a lower portion of the second cavity of the fluid pressure driving unit and which is made of a transparent material,
    wherein a focal length is adjusted by changing the curvatures of the surfaces of the first and second liquids contained in the first cavity of the lens barrel and the curvature of the first transparent elastic membrane by using a voltage applied to the lens barrel and the conductive transparent substrate and the fluid pressure of the first and second liquids.

2. The variable focus liquid lens according to claim 1, wherein the first liquid is any one of an insulating liquid and a conductive liquid, and
    wherein the second liquid is the other one of the insulating liquid and the conductive liquid.

3. The variable focus liquid lens according to claim 1, wherein the first cavity of the lens barrel has a shape of a hemisphere in cross-section.

4. The variable focus liquid lens according to claim 1, wherein the fluid pressure generating groove is perpendicularly connected to the first cavity.

5. The variable focus liquid lens according to claim 1, wherein two or more fluid pressure generating grooves are formed in the fluid pressure driving unit, and the fluid pressure generating grooves are disposed symmetrically with respect to the second cavity.

6. The variable focus liquid lens according to claim 1, wherein the lens barrel is made of silicon (Si) and further includes an insulating film on a surface which is in contact with the fluid pressure driving unit.

7. The variable focus liquid lens according to claim 1, wherein the actuator of the fluid pressure driving unit includes:
   a second transparent elastic membrane which is fixed on an inner wall of the fluid pressure generating groove;
   a permanent magnet which is disposed in a sealed space between an inner wall of the fluid pressure generating groove and the second transparent elastic membrane; and
   a solenoid which is disposed in a body of the fluid pressure driving unit adjacent to the inner wall on which the second transparent elastic membrane is fixed,
   wherein the actuator changes a position of the permanent magnet by using the solenoid and deforms a shape of the second transparent elastic membrane according to the position of the permanent magnet so as to adjust the fluid pressure.

8. The variable focus liquid lens according to claim 7, wherein the solenoid is adhered to a body of the fluid pressure driving unit by using a curable polymer.

9. The variable focus liquid lens according to claim 1, wherein the actuator of the fluid pressure driving unit is configured with a piezoelectric device.

10. The variable focus liquid lens according to claim 1, further comprising a controller which controls the driving of the actuator and the voltage applied to the lens barrel and the conductive transparent substrate outside the variable focus liquid lens,
   wherein the controller adjusts the fluid pressure by controlling the driving of the actuator.

* * * * *